Nov. 23, 1965 — L. M. HARTMAN — 3,218,904
GUITAR TRAINING DEVICE
Filed Oct. 9, 1963 — 2 Sheets-Sheet 1
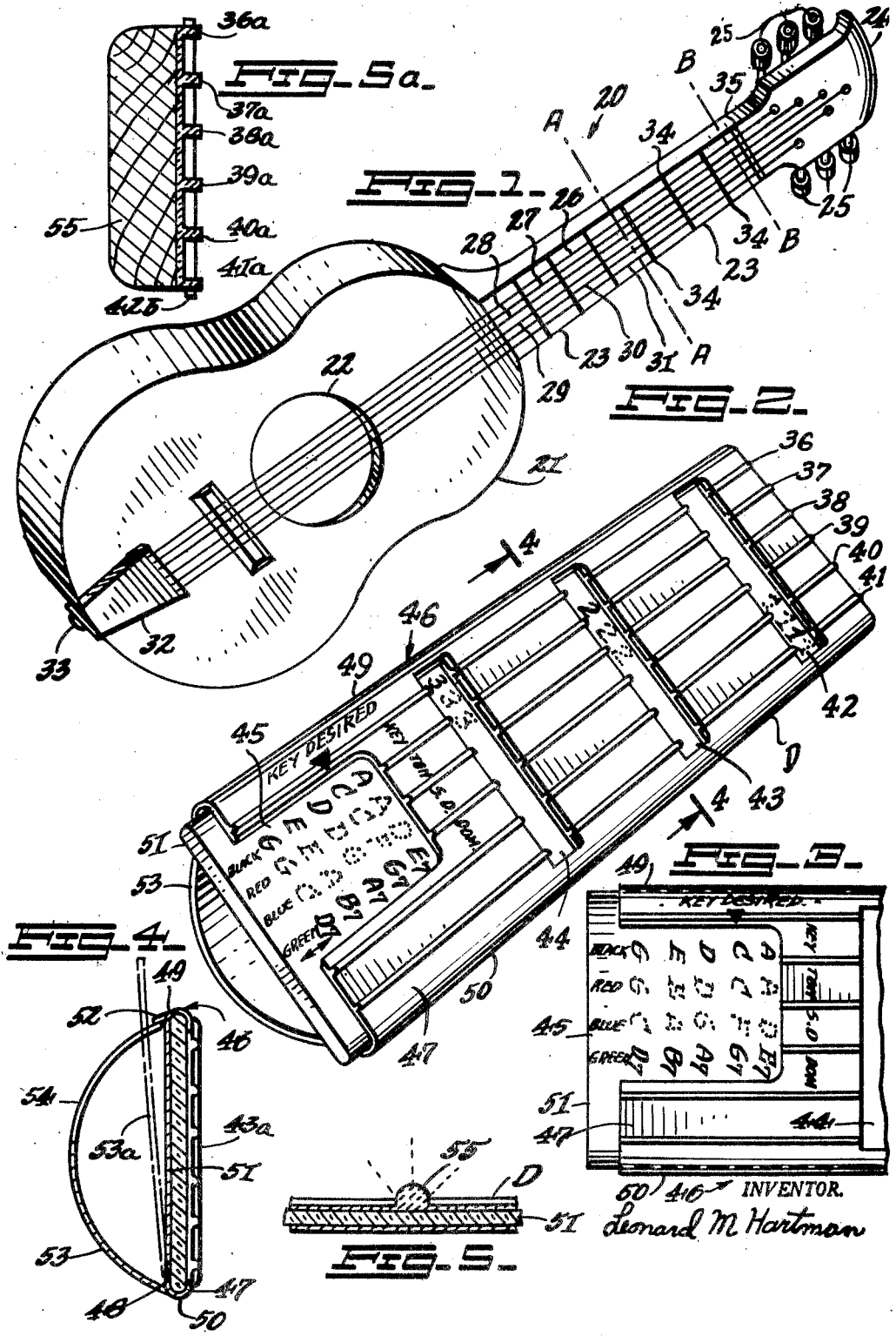
INVENTOR.
Leonard M. Hartman Nov. 23, 1965 L. M. HARTMAN 3,218,904
GUITAR TRAINING DEVICE
Filed Oct. 9, 1963 2 Sheets-Sheet 2
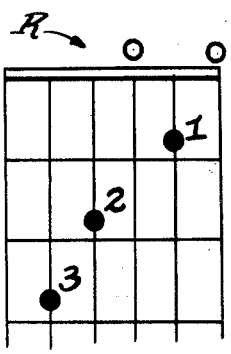
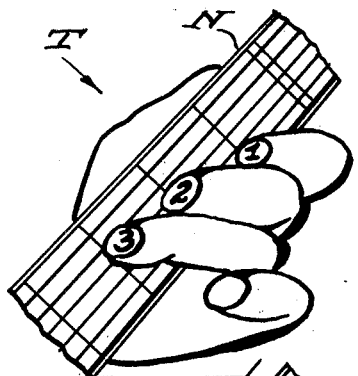
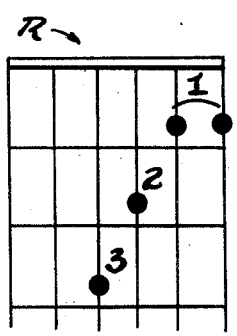
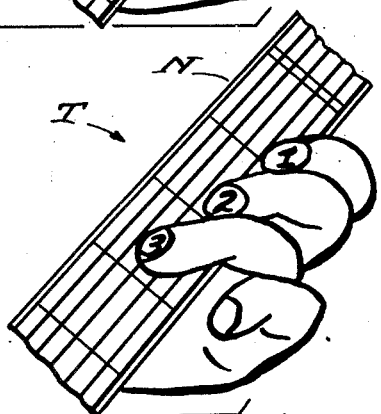
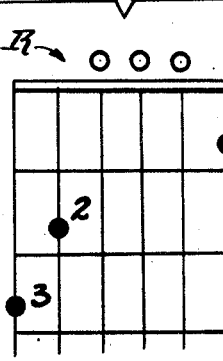
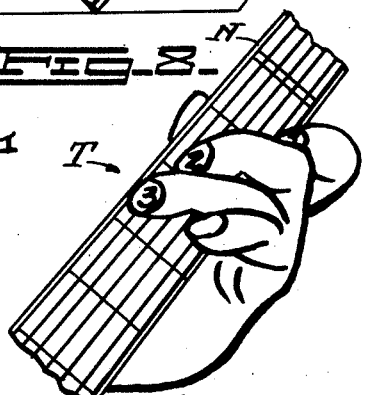
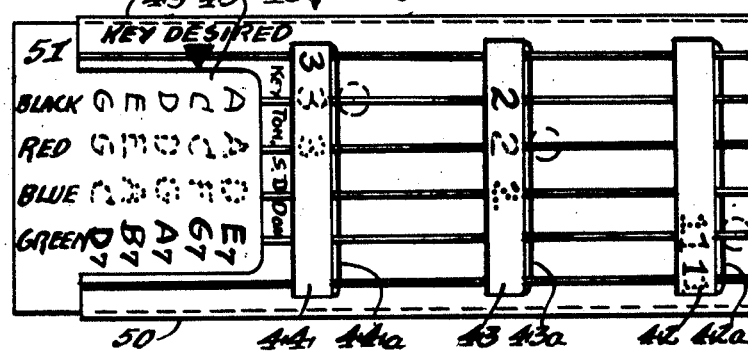
INVENTOR.
Leonard M. Hartman

United States Patent Office 3,218,904
Patented Nov. 23, 1965

3,218,904
GUITAR TRAINING DEVICE
Leonard M. Hartman, 603 E. 29th St., New York, N.Y.
Filed Oct. 9, 1963, Ser. No. 315,085
4 Claims. (Cl. 84—485)

The present invention relates to musical devices, and more particularly it relates to a device which may facilitate teaching and training one in the use of a string instrument, such as a mandoline, a balalika, a guitar etc. Mainly, the object of this invention is to provide a musical training instrument which will make training possible without the use of an instrument with actual strings (silent training).

A string instrument such as a conventional guitar may be formed of the following sections: The sound box with its sound hole; the finger board or the neck; the nut; the machine head or the tuning keys; the strings; the tail piece, and the bridge. The strings are stretched tight over the sound box and the finger board is divided by means of the tuning keys, and the finger board by means of a number of raised ridges called frets to form about twenty different subdivisions. The nut is the uppermost fret disposed near the tuning keys, while the bridge is disposed at the lowermost end of the guitar's sound box to hold the stretched strings.

It is fully realized that there are musical training devices in present use which are cumbersome, inefficient and hard to operate. Because of these disadvantages a student would rather use a real guitar to practice and train on. The present device eliminates the disadvantages encountered in practicing on a real guitar. The device in question is small in size and easily portable; it represents only the length of four frets of a guitar's neck; since fingering a guitar uses only up to four frets at a time the device eliminates the unnecessary bulk of the rest of the guitar. Furthermore, the device needs none of the retuning which is otherwise required before playing a guitar. The device eliminates the time and effort involved in removing the guitar from and retuning it to its protective case or bag, and the device avoids damage to the guitar since it is more rugged and would be often used in its place. And finally, the device is silent and may be used to practice in public places, without annoyance to others.

The primary object of this invention is to provide a self training device of the class described which may be an exact reproduction of a section of the guitar's finger board and may comprise at least the first four frets of the neck of a real guitar, just below the nut in the finger board.

Another object of this invention is to provide an inexpensive training device for beginning students of the guitar so they may start practice in the case of large classes that must start their training in unison.

Another object of this invention is to provide a dummy segment of a guitar neck on which a student may conveniently practice the fingering of guitar cords; increasing the speed and accuracy with which he moves his fingers from one position to another.

A further object of this invention is to simulate the strings and frets of a guitar by means of ridges running lengthwise and transversly, respectively, upon the finger board. These ridges simulate for the student the tactile sensation of fingering the guitar and enable him to position his fingers correctly without sight and by touch alone which is an objective of the practice.

An additional object of this invention is to decrease the irritation of the student's finger tips since the simulated string ridges need only be touched lightly and do not require the pressure needed to depress the strings to touch the finger board. This eliminates the discouragement that sore fingers cause in the beginning student.

A further object of this invention is to enable the student to practice silently and inconspicuously so that the device may be used at times and places where a real guitar would be too bulky, noisy and conspicuous.

Another object of this invention is to provide a means for holding the device in the left hand and for the purpose of allowing for lightness, compactness and easy portability constructing the curved under surface of the device to resemble the neck segment and be formed of a flexible, resilient sheet of plastic that can be flattened against the underside of the finger board for compactness, or locked in an arched arcuate position when in use.

Another object of this invention is to provide a training device of the class described made preferably of plastic (although metal, wood and other materials may be used) to allow for ease of manufacture by constructing the training device from sheet plastic.

A further object of this invention is to provide visual means to indicate combinations of chords commonly used in playing simple melodies on the guitar such as C, F and G7 or G, C and D7.

Another object of this invention is to provide visual means to indicate the correct finger positions employed in producing the various chords (this need be referred to visually only until the positions have been memorized by the student).

A further object of this invention is to provide a slide or slides in the device upon which may be noted the fingering positions for all chords used in an entire melody and to enable the operator to make visual referencs as to the fingering of an entire melody without having to change the position of the slide. This is accomplished by a tabular arrangement in which all chords of any combination may be viewed together through the slots at a position of the slide corresponding to that combination.

Another object of this invention is to provide means to distinguish the finger positions for each chord within the chord combination being viewed, by numbers of a different color for each word.

A further object of this invention is to permit rapid transposition of a tune from one key to another by indicating in tabular form the corresponding chords used in playing in various keys. These are marked or imprinted upon the slide as follows

| For the Key of: | Major Chords | | |
|---|---|---|---|
| A | A | D | E7 |
| C | C | F | G7 |
| E | E | A | B7 |
| D | D | G | D7 |
| G | G | C | D7 |

Most folk songs can be accompanied on the guitar by using a sequence or group composed of only a few (two or four) chords. For example, in the song "On Top of Old Smoky" only the chords C, F and G7 are needed. Other chord groups used in popular major keys are:

| Key of— | Tonic | Sub Dominant | Dominant |
|---|---|---|---|
| C | C | F | G7 |
| G | G | C | D7 |
| F | F | Bb | C7 |
| D | D | G | A7 |
| A | A | D | E7 |
| E | E | A | B7 |

Some chord groups used in popular minor keys are:

| Key of— | Tonic | Sub Dominant | Dominant |
|---|---|---|---|
| Am | Am | Dm | E7 |
| Em | Em | Am | B7 |
| Dm | Dm | Gm | A7 |

In order to play the above guitar chords with ease and at the proper tempo, one must be able to shift his fingers rapidly and accurately between positions used to finger these chords. This is especially difficult for the beginning student of guitar. The present device enables the student to concentrate his practice of fingering groups of two or four chords as they would be used in actual songs thus training him not only in the production of individual chords but in changing from one chord to another within a group.

This invention also consists in certain other features of construction, and the combination and arrangement of parts, to be hereinafter fully described, illustrated in the accompanying drawings, and specifically pointed out in the appended claims.

In describing the invention in detail, references will be made to the accompanying drawings where like character numerals denote like or corresponding parts throughout the several views, in which:

FIG. 1 is a perspective view showing a conventional guitar. The section in the guitar neck, just below the nut indicated by the dotted lines comprising the embodiment of the present invention;

FIG. 2 is a perspective view showing the training device in the present invention;

FIG. 3 is a plan elevational view of the card index in the device shown in FIG. 2;

FIG. 4 is a section taken on the line 4—4 of FIG. 2 showing the thumb opening to hold the training device;

FIG. 5 shows a modification;

FIG. 5a is a section through another modification;

FIG. 6 is a diagrammatic illustration of the chord C and the position of the fingers on the finger board;

FIG. 7 is a diagrammatic illustration of another chord F and the position of the fingers on the finger board;

FIG. 8 is an additional illustration of another chord G7 and its respective position on the finger board; and FIG. 9 is a plan elevational view and legend showing the device of the present invention and the relationship of the various notations upon the slide.

It is to be understood that the present form of disclosure is merely for the purpose of illustration, and that there might be various modifications thereof, without departing from the spirit of the invention as herein set forth.

Referring now more particularly to the guitar 20, best shown in FIG. 1, made in accordance with the present invention, it comprises, in combination, the sound box 21; the sound hole 22; the finger board or the neck 23; the machine head 24; the tuning keys 25; the strings (six in number) 26, 27, 28, 29, 30 and 31, respectively; and the pin 33 mounting the tail piece 32 to the sound box.

It can be discerned that the six strings 26 to 31, inclusive, may be stretched tight over the sound box 21 and the finger board 23 between the bridge and the tuning keys 25, while the finger board, by means of a number of raised ridges 34, called frets, may be divided into about twenty different subdivisions. The nut 35 is disposed near and adjacent to the tuning keys, while the tail piece 32 (held by the pin 31) is disposed at the lowermost end or section of the guitar's sound box 21, to hold the stretched strings 26 to 31, inclusive, substantially as shown.

While the construction and the various details of a conventional guitar have been minutely described above, this was only necessary for the purpose of illustration. In practice, and more referring to the present invention, the training device herein described utilizes only a small section of the guitar neck 23, and more particularly that section of the finger board enclosed in FIG. 1, by the dotted lines A—A and B—B, respectively.

FIG. 2 shows in perspective a plan elevational view of the present invention which is comprised by the section of the guitar neck enclosed by the lines A—A and B—B in FIG. 1. Reference now being made to FIG. 2, the device D, preferably made of plastic (although wood and metal also may be used), may be formed with a number of raised ridges 36, 37, 38, 39, 40 and 41, respectively, corresponding to the strings 26 to 31, inclusive, shown in FIG. 1. Furthermore, the device D may be provided with several rectangular elongated cutouts 42, 43 and 44, inclusive, which may correspond to the three frets 34 shown in FIG. 1. It can be seen that the rectangular cutouts or slots 42, 43 and 44 may be of substantial length and width and may be disposed perpendicularly to the raised ridges 36 to 41, inclusive. Additionally, it can be seen that another cutout 45 may be disposed at the lowermost end of the device D to expose a slide. A ridge 42a, 43a and 44a is disposed at one end of the cutouts 42, 43, and 44, substantially as shown in FIG. 9 (not shown in FIG. 2).

Referring more particularly to the general construction of the training device D, preferably it may be formed of a hollow elongated O-shaped plastic member 46, comprising a pair of side sections 47 and 48, respectively, and the arcuate end sections 49 and 50. A slide 51 (or slides) of substantial length (made of plastic or paper) with various insignia imprinted upon it, may be made to slide freely within the elongated O-shaped member 46, substantially as shown. While one arcuate section 49 may be provided with an extension 52, the other arcuate section 50 may be provided with an extension flap 53. In as much as the flap 53 may be of greater width than the O-shaped member 46, when it is bent from its original position 53a, shown in dotted lines, to its arcuate position 53, it forms a backbone for the handling and manipulation of the training device. It can be seen that a cutout section 54 may be provided in the flap 53 which may be utilized by the thumb of the left hand which may be inserted into the cutout 54 to support the device D when in use.

Relative to the FIGS. 6, 7 and 8, inclusive, they show the manner in which the guitar device D may be utilized for training purposes. For the sake of illustration each respective figure shows how the chords of C, F and G7, may be played upon a standard guitar. Also, each figure shows the manner in which the notes for each chord are written in their respective staff lines S; the standard diagrammatic representation of the chords in a chart R, and the relative position of the fingers of the left hand on the neck N in a guitar to produce these chords.

In the case of FIG. 6 (which represents a chord in the key of C) it may be seen that the latter may consist of the notes C, E, G, C and E, respectively. The numerals shown above the staff lines represent the four fingers of the left hand numbered 1, 2, 3 and 4, respectively, with the numeral 0 representing an open note which is not depressed by a finger. In their diagrammatic representation in the chart R the notes played by finger pressure are shown by means of black dots, while the open notes are shown by means of white dots. At T one may see the actual position of the fingers 1, 2 and 3, upon the guitar strings. In this case the first string from the right is an open string, the second string is played by the 1st finger, the third string is an open string, the fourth string is played by the 2nd finger and the fifth string is played by the 3rd finger (the sixth string is not played at all). In this relative position of the fingers 1, 2 and 3 upon the neck N of a guitar all five strings are struck by the right hand to produce the chord C (the sixth string as above already described is not played).

Translating the above example of real guitar playing to the training device D, the latter may be held by the left hand in similar manner above described in FIG. 6 to produce the chord C. Referring to FIG. 9, which illustrates the training device D, the student places the first finger (1) in the cutout 42 (or the ridge 42a) which is adjacent to the raised line 40 (and represents the second string of a real guitar); the second finger is placed in the cutout 43 (or the ridge 43a) which is adjacent to the raised line 38 (and represents the fourth string of a real guitar) and the third finger is finally placed in the cutout 44 (or the ridge 44a) and upon the raised line 37 (and represents the fifth string of a real guitar). Thus it is possible to simulate guitar playing without the need for sounding the chord C. By this means an average student may learn to simulate the chord C, or the chord F, or the chord G7 (shown in FIGS. 7 and 8, respectively) or any other chord in any other key, as well. By frequent practice with the device D, it may be possible to learn the playing of various popular guitar chords which eventually may be helpful to play the chords thus learned upon a real guitar.

Reference now being made to FIG. 9 (which is a plan elevational view of the training device shown in FIG. 2) it can be seen that the slide 51 may be imprinted by means of various colors to represent and to correspond to the various chords used in one particular key. For instance, it can be seen that the slide 51 may be subdivided into the chords tonic A, C, D, E and G, imprinted in red; subdominant D, F, G, A and C imprinted in blue, and the dominant chord E7 G7, A7, B7, and D7, imprinted in green. For the sake of illustration in the drawing and more particularly in FIG. 9, the color red is shown by dashed lines (– – –), the color blue is shown by the dotted (. . .) and the color green is shown by solid black lines (——). Also see legend.

Furthermore, the various positions of the fingers may be imprinted upon the slide 51 in colors so as to show clearly through the slots or the cutouts 42, 43 and 44, inclusive, in red, blue and green. The device D, upon its left side carriers imprinted upon it a pointer T which points towards the key of C (represented in this case by FIG. 6, which is concerned with the position of the fingers 1, 2 and 3 to produce the chords of the key of C, namely C, F and G7). In as much as the position of the four fingers is also imprinted upon the slide 51 in various colors to represent the various chords, accordingly, the finger numbers may show through the slots or the cutouts 42, 43 and 44, which represent the frets. It is, of course, understood that to allow the use of the training device D in a different key, say the key of E, the slide 51 is moved accordingly so that the pointer T may point to the appropriate key simbol (marked in the slide 51 in black). In the event the player student desires to learn a particular chord, for instance the chord G, the slide 51 is moved until the numerals representing the finger position shows through the cutouts 42, 43 and 44, so as to allow the use of the device in that particular chord.

Referring to the modification shown in FIG. 5, instead of the slots 42, 43 and 44 (see FIGS. 2 and 9) the training device may be provided with an elongated lens-like member (or members) 55 which may be disposed over the imprinted finger insignia in the slide 51, for the purpose of enlargement and to improve vision. In regard to the modification shown in FIG. 6a, the strings may be readily represented by the solid embossed surfaces 36a to 41a, inclusive, while the frets may be indicated by the vertical embossed surfaces 42b. The front end of the device in FIG. 6a, preferably may be formed of rubber, while the rear end 56 may be formed of wood, metal or plastic.

A careful examination of the foregoing description in conjunction with the invention as illustrated in the drawings, will enable the reader to obtain a clear understanding and impression of the alleged features of merit and novelty, sufficient to clarify the construction of the invention as hereinafter claimed.

Minor changes in shape, size and materials, and rearrangement of parts, may be restored to in actual practice, as long as no departure is made from the invention claimed.

Having described my invention, what I claim is the following:

1. A training device of the class described for string instruments, comprising, in combination, a rectangular, elongated body having a flat upper surface and an arcuate rear end, a plurality of parallel lines embossed lengthwise upon said flat surface, and a plurality of slots provided upon said flat surface, said slots disposed at right angles to said parallel lines, a slide in said device, chord insignia imprinted upon said slide representing the various chords, and number insignia imprinted upon said slide representing the position of fingers in playing said string instrument, a pointer imprinted upon said device, said pointer pointing to a specific chord imprinted upon said slide, the respective numerals of finger positions imprinted upon said slide being readily visible through the slots disposed upon said flat surface in said training device.

2. The combination according to claim 1, said embossed parallel lines extending above the surface of said device to represent the six strings of a real guitar.

3. The combination according to claim 1, said slots in said device representing three frets of a real guitar.

4. The combination according to claim 1, the arcuate rear end of said device simulating the arcuate rear end of the neck of a real guitar, and a thumb opening in said arcuate end to facilitate holding said device by means of the left hand.

References Cited by the Examiner

UNITED STATES PATENTS

| | | | |
|---|---|---|---|
| 826,379 | 7/1906 | Sprotte | 84—314 |
| 830,915 | 9/1906 | Myers | 84—485 |
| 1,556,147 | 10/1925 | Johnson et al. | 84—485 |
| 1,751,048 | 3/1930 | Wiessner | 84—485 |
| 1,821,516 | 9/1931 | Hohn | 84—485 |
| 2,225,613 | 12/1940 | Alyn | 84—314 |

FOREIGN PATENTS 9,641    1900    Great Britain.

LEO SMILOW, *Primary Examiner.*

UNITED STATES PATENT OFFICE
CERTIFICATE OF CORRECTION

Patent No. 3,218,904　　　　　　　　　　　　　　November 23, 1965

Leonard M. Hartman

It is hereby certified that error appears in the above numbered patent requiring correction and that the said Letters Patent should read as corrected below.

In the heading to the printed specification, line 3, for "603 E. 29th St., New York, N. Y." read -- 603 E. 29th St., Brooklyn, N. Y. --.

Signed and sealed this 25th day of October 1966.

(SEAL)
Attest:

ERNEST W. SWIDER　　　　　　　　　　　　　　EDWARD J. BRENNER
Attesting Officer　　　　　　　　　　　　　　Commissioner of Patents